UNITED STATES PATENT OFFICE.

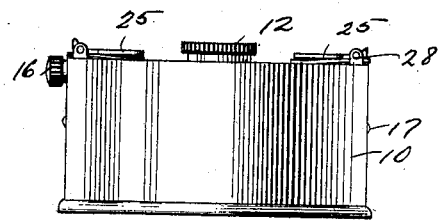
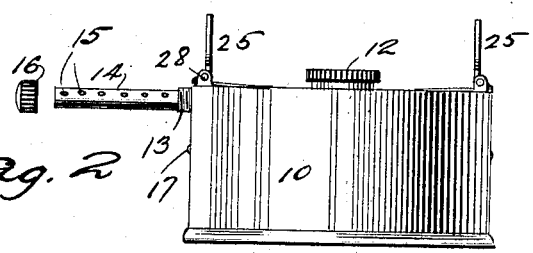
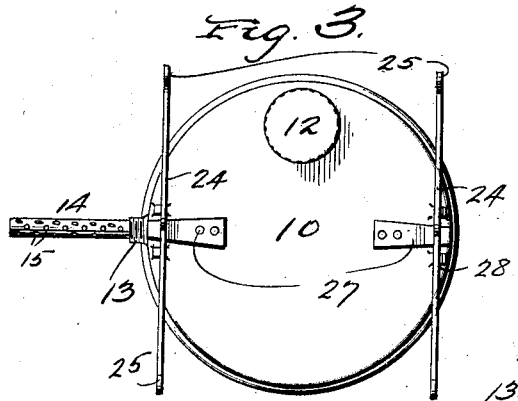
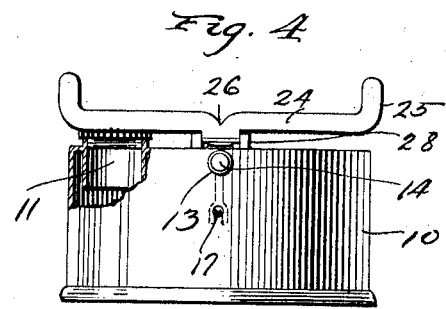
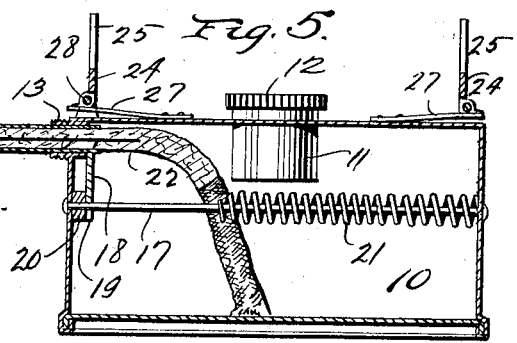
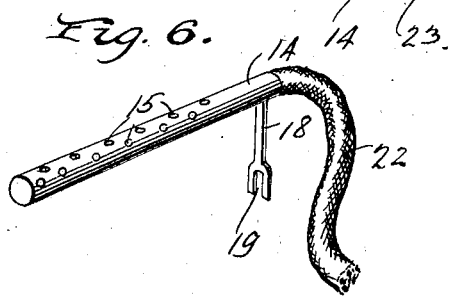

STANLEY MILAM, OF AUGUSTA, MONTANA.

CURLING-IRON HEATER.

1,385,465.  Specification of Letters Patent.  Patented July 26, 1921.

Application filed March 27, 1920. Serial No. 369,210.

*To all whom it may concern:*

Be it known that I, STANLEY MILAM, a citizen of the United States, residing at Augusta, in the county of Lewis and Clark, State of Montana, have invented certain new and useful Improvements in Curling-Iron Heaters; and I do hereby declare the following to be a full, clear, and exact description of the invention, such as will enable others skilled in the art to which it appertains to make and use the same.

This invention is an improvement in heaters and has particular reference to a device for heating curling irons and other implements.

An object of the invention is to provide a heater wherein certain parts are adjustable to inoperative positions to render the device compact so that the same may be conveniently carried about and the leakage of fuel therefrom prevented.

Another object is the provision of a burner tube adapted to be recessed within the heater casing when the same is in inoperative position and which is projected to its operative position by pressure from within the casing.

A further object is to provide a heater of this character which is simple in construction, easy to manufacture and effective in carrying out the purpose for which it is designed.

The inventive idea involved is capable of receiving a variety of mechanical expressions, one of which, for the purpose of illustrating the invention is shown in the accompanying drawing, wherein:—

Figure 1 is a side elevation of the heater with its parts in inoperative position.

Fig. 2 is a similar view with the parts in operative position.

Fig. 3 is a top plan view.

Fig. 4 is an end elevation.

Fig. 5 is a longitudinal section.

Fig. 6 is a detail perspective view of the burner tube.

The drawing illustrates what is now believed to be a preferred form of the invention which comprises a casing 10 of substantially cylindrical formation and adapted to contain a burning fluid, such as alcohol, which is poured into the casing through a tube 11 depending from the top thereof and normally closed with a screw cap 12. Preferably adjacent the top of the casing and at one end thereof the same has mounted therein an externally threaded bushing or bearing 13 in which is slidably mounted a burner tube 14 having the usual perforations 15. This tube is mounted to slide longitudinally of the casing and, when in its inoperative position, the same is recessed within said casing beneath the top thereof and is held thus by means of a screw cap or closure 16 which engages the threads of the bushing 13.

Means are provided for projecting the burner tube 14 toward its operative position when the screw cap 16 is removed and this means preferably comprises a guide rod 17 extending longitudinally of the casing and having its ends secured in the end walls thereof intermediate the top and bottom. The inner end of the burner tube 14 is preferably provided with a depending arm or guiding element 18 having an opening 19 adjacent its lower end for receiving the rod 17 and outward movement of the burner tube is limited by contact of said arm with the small abutment 20 carried by the rod 17 at the adjacent end of the casing. Inward movement of the burner 14 is limited by contact with one end of a coil spring 21 mounted upon the rod 17 and having its other end in engagement with the opposite end wall of the casing. It will be apparent from this construction that when the burner tube is pushed inwardly toward its inoperative position, the arm 18 will eventually contact the adjacent end of the spring 21 and compress the same before the outer end of the tube is recessed within the bushing 13 and in this manner a constant outward pressure upon said tube will be exerted while the same is in its inoperative position so that as soon as the cap 16 is removed the spring will force the tube 14 outwardly toward its operative position. If said spring has not sufficient tension to project the tube 14 entirely to its operative position, the operator may grasp the projecting end of said tube and pull the same outwardly until the arm 18 contacts the abutment 20.

The tube 14 has mounted therein one end of the usual wick 22, said end being reinforced by a rod 23 extending longitudinally thereof so that the same may be readily mounted in its proper position. In this manner the fuel from the casing will be fed into the burner tube where the same may be ignited and the heat and flame pass through the openings 15.

It is further proposed to support a curling iron or other heater above the casing and burner tube so that the latter will act directly upon the iron and, to this end, use is preferably made of a pair of holders pivotally connected to the top of the casing at the ends thereof and each holder consisting of oppositely directed arms 24 extending transversely of the casing and having their free ends 25 bent upwardly. The inner ends of the arms 24 are notched as indicated at 26 so that the curling irons may be supported in a position directly over the burner tube 14 and extend longitudinally thereof. The ends 23 are sufficient distance apart to receive the handles of the curling iron therebetween so that lateral movement of the implement, when being heated, is prevented. The holders are held in a vertical or operative position by means of the leaf springs 27 which are detachably engaged with the central portion of each holder. When said holders are not in use the springs may be disengaged therefrom and the holders swung about their pivots 28 to a horizontal position where the same will rest upon the top of the casing.

What is claimed is:—

1. A heater of the class described comprising a casing, a burner tube slidably mounted in said casing and adapted to be recessed within the same when the tube is in inoperative position, means within the casing for projecting said tube therefrom toward its operative position, and means for retaining said burner tube in its inoperative position against the action of the last named means.

2. A heater of the class described comprising a casing a burner tube slidably mounted in said casing and adapted to be recessed within the same when the tube is in inoperative position, means within the casing limiting the movement of the burner tube to its inoperative position and operable to project said tube toward its operative position.

3. A heater of the class described comprising a casing a burner tube slidably mounted in said casing and adapted to be recessed within the same when the tube is in inoperative position, means within the casing limiting the movement of the burner tube to its inoperative position and operable to project said tube toward its operative position, and means carried by the burner tube for limiting the movement thereof toward its operative position.

4. A heater of the class described comprising a casing having a bushing in one end thereof, a burner tube slidably mounted in said bushing and projecting from the casing when in operative position, a rod mounted within the casing, a guiding arm carried by the burner tube and having an opening for receiving said rod and adapted for contact with the adjacent end of the casing to limit the outward movement of said tube, and a coil spring mounted upon said rod and engaged by said arm when the burner tube is adjusted toward its inoperative position within the casing whereby said spring is compressed to exert an outward pressure upon the burner tube.

5. A heater of the class described comprising a casing having a bushing in one end thereof, a burner tube slidably mounted in said bushing and projecting from the casing when in operative position, a rod mounted within the casing, a guiding arm carried by the burner tube and having an opening for receiving said rod and adapted for contact with the adjacent end of the casing to limit the outward movement of said tube, a coil spring mounted upon said rod and engaged by said arm when the burner tube is adjusted toward its inoperative position within the casing whereby said spring is compressed to exert an outward pressure upon the burner tube, and a screw cap engageable with said bushing for retaining said burner tube in inoperative position against said outward pressure.

In testimony whereof I affix my signature in the presence of two witnesses.

STANLEY MILAM.

Witnesses:
M. L. PARCELLS,
I. M. NANSON.